US005659306A

United States Patent [19]

Bahar

[11] Patent Number: 5,659,306

[45] Date of Patent: Aug. 19, 1997

[54] EXPIRED PARKING METER INDICATOR

[76] Inventor: Reuben Bahar, 23708 Welby Way, West Hills, Calif. 91307

[21] Appl. No.: 665,011

[22] Filed: Jun. 17, 1996

[51] Int. Cl.[6] ........ B60Q 1/48

[52] U.S. Cl. ........ 340/932.2; 340/309.15; 340/933; 368/7; 368/90; 368/92; 194/902

[58] Field of Search ........ 340/932.2, 933, 340/938, 309.15, 539, 825.54; 194/217, 218, 902; 368/7, 90, 92

[56] References Cited

U.S. PATENT DOCUMENTS

| | | | |
|---|---|---|---|
| 4,823,928 | 4/1989 | Speas | 194/217 |
| 4,876,540 | 10/1989 | Berthon et al. | 340/932.2 |
| 5,029,094 | 7/1991 | Wong | 368/7 |
| 5,065,156 | 11/1991 | Bernier | 340/932.2 |
| 5,442,348 | 8/1995 | Mushell | 340/932.2 |
| 5,454,461 | 10/1995 | Jacobs | 340/932.2 |

*Primary Examiner*—Thomas Mullen
*Assistant Examiner*—Edward Lefkowitz
*Attorney, Agent, or Firm*—Edgar W. Averill, Jr.

[57] ABSTRACT

An expired parking meter indicator with electronic components which detect the presence of a vehicle in the parking place. When a vehicle pulls into a parking place a signal is received by the parking meter which after a grace period emits a signal if no payment has been made. Furthermore, if a payment has been made and the vehicle remains in the parking place longer than the time received for the payment, a signal will also be generated. A parking control officer will be capable of receiving the signal and, thus, very efficiently citing parking violations.

8 Claims, 2 Drawing Sheets

EXPIRED PARKING METER INDICATOR

BACKGROUND OF THE INVENTION

The field of the invention is parking meters and the invention relates more particularly to electronic parking meters.

Parking meters have been used to increase the availablility of parking spaces in urban areas by limiting the amount of time that a vehicle can legally occupy a parking space. Such meters also become a source of revenue in larger urban areas by collection of parking fines. The conventional parking meter used in most cities is a completely mechanical device which has a coin deposit slot and a handle which is turned after a coin is deposited. The turning of the handle retracts a red violation sign and initiates a clock which indicates the time remaining on the parking meter as the result of the deposit of money. When the time has expired the red violation sign once again covers the window. A parking control officer periodically surveys the parking meters and writes a citation for violations which he observes. Because of the relatively small size of the parking meter and the relatively large size of numerous vehicles, such as vans, the detection of parking violations is a slow, tedious, labor-intensive task.

BRIEF SUMMARY OF THE INVENTION

It is an object of the present invention to make the collection parking fines more efficient to provide an additional source of revenue for a city as well as to make more parking spaces available by reducing the number of persons continuing to park in violation.

The present invention is for an expired parking meter indicating system to facilitate the enforcement of parking regulations and to reduce the work force to bring about enforcement. The system includes, in addition to a parking meter and a parking space, a detector connected to the parking meter to ascertain the presence of a motor vehicle in the associated parking space and to provide a vehicle presence signal to initiate a parking control cycle. Payment receiving means are affixed to the parking meter which either receive coins or, if desired, a credit card. The payment receiving means provide a payment and payment amount signal when such payment is made. The payment receiving means include a delay circuit to provide the driver a reasonable time to make payment before a time out signal is given. Timing means include a signal receiving circuit responsive to both a vehicle presence signal from the detector and the payment and payment amount signal of the payment receiving means. The timing means further include means for sending a time out signal when the combination of the payment and payment amount signal and the duration of the presence of the vehicle signal indicate a time out condition. A signal generator control is connected to the parking meter and is responsive to a time out signal from the timing means and provides an output signal receivable by a parking control officer. Reset means are connected to the detector so that when a driver removes a vehicle a new parking control cycle will not be initiated until a new vehicle enters the parking place. Preferably the output signal is a wireless signal that the parking control officer can receive at a distance and thus is freed of the necessity of slowly checking meters which are not in violation. The meter may be activated only during week days during a predetermined parking control time period.

DESCRIPTION OF THE PREFERRED EMBODIMENTS

Figure 1:
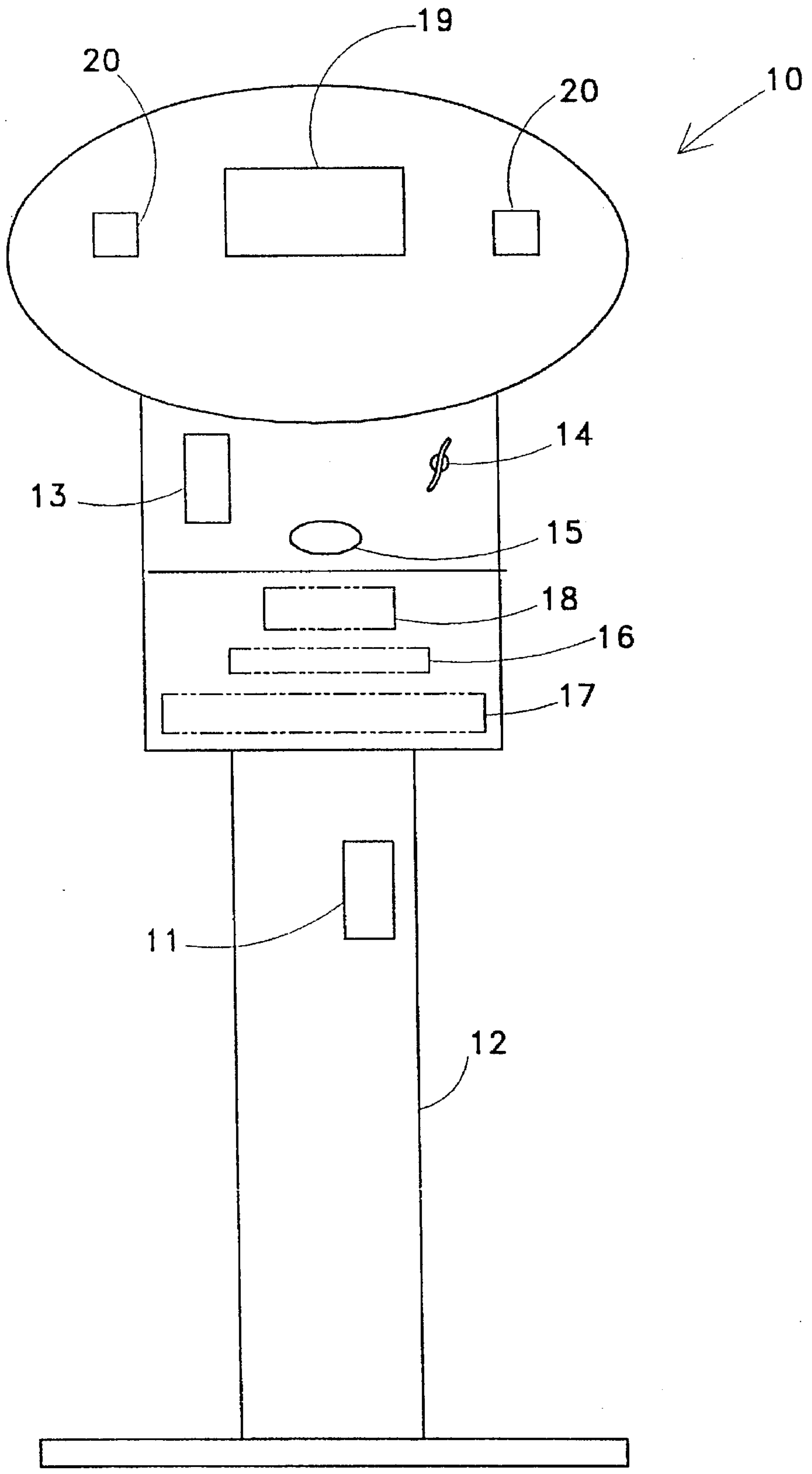
FIG. 1 is a diagramic view of a parking meter useful with the expired parking meter indicating system of the present invention.

A parking meter is shown in FIG. 1 diagramically and indicated generally by reference character 10. Parking meter 10 has a detector 11 which detects the presence of a vehicle in the parking space. While detector 11 is shown positioned on post 12 of parking meter 10 it, of course, need not be so positioned. For instance, a capacitance loop could be located in the parking space to provide a signal to the control circuitry of the parking meter 10. The important feature is that the meter is provided with a signal continuously during the time a vehicle is present in the parking space. Payment receiving means shown as a slot 13 for insertion of coins are held to the parking meter. While a coin slot 13 is shown, other payment receiving means such as a credit card slot can also be used. In the event coins are inserted, it is typically appropriate to provide a handle 14 to physically move the coins into cash box 15.

The parking meter includes timing means 16 which are activated when the detector indicates the presence of a vehicle. The timing means are also responsive to the payment receiving means, thus providing a longer time signal when greater amounts of coins are inserted. The signal generator control means 17 receive a time out signal from the timing means when the combination of payment made and time of vehicle presence indicate such a signal should be sent. When a vehicle leaves the parking space, the meter is placed in an idle condition and when a new vehicle enters the parking place the detector 11 starts a new parking control cycle. It also preferably resets the remaining time to zero. A remaining time readout 19 indicates to the user the amount of time left before a time out signal is transmitted.

When a time out signal is transmitted, it may be indicated in several ways. For instance, a visible light 20 may begin flashing. Also, a signal is generated which is receivable by a parking control officer, preferably sent in a wireless manner to a remote location. In this way, the parking control officer can efficiently cover the expired meters without wasting time on non-expired meters.

Figure 2:
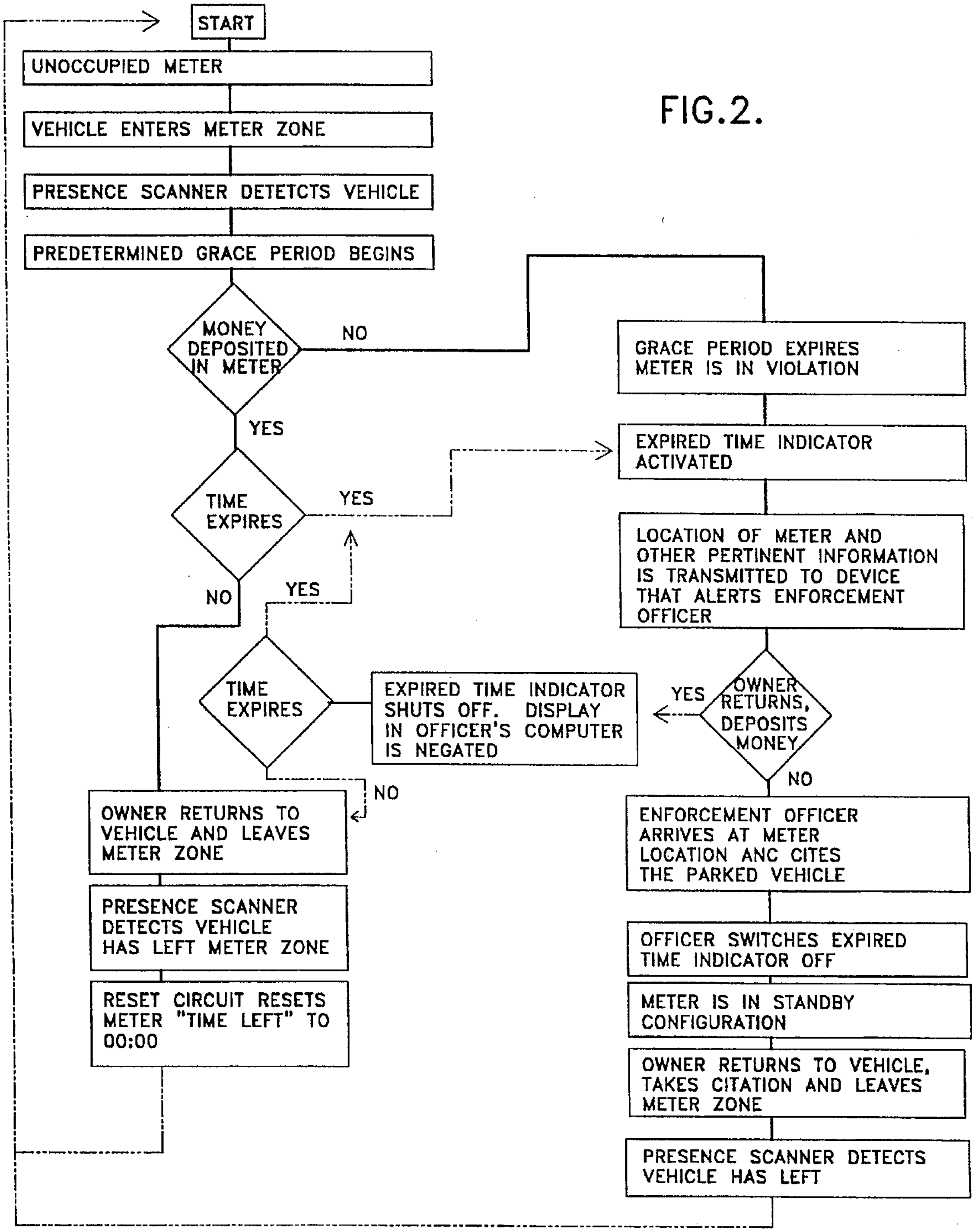
FIG. 2 is a flow sheet showing the steps utilized by the expired parking meter indicating system of the present invention.

The operation of the system of the present invention is shown in the flow chart of FIG. 2 where the system is idle in the start configuration with the parking place unoccupied. Once a vehicle enters the parking zone, the detector 11 detects the presence of the vehicle and sends a signal to initiate a parking control cycle. Preferably a grace period is initiated to give the driver time to make a payment before a violation signal is generated. If money is deposited, the timer is started responsive to the amount of money deposited. If money is not deposited the grace period expires and the meter is in violation. Violation results in the turning on of lights 20 or the initiation of some other visible condition so that the driver is reminded of the violation. In addition, the meter transmits a signal which is receivable by a parking control officer which signal continues until either the owner returns and deposits money or an enforcement officer cites the parked vehicle. If an enforcement officer cites the parked vehicle, he terminates the parking control cycle which places the meter in a standby condition. After the parking violator has left and a new vehicle enters the parking space the parking control cycle is initiated again. As the car leaves the space, the mter is reset to 00:00. Naturally, if the owner returns before the time has expired, the vehicle leaves without causing any time out signal.

When a new vehicle enters the empty parking space the parking control cycle once again is initiated. The result of the parking meter system of the present invention is a substantial improvement in parking control. In the present times of tight civic finances revenue can be substantially increased in three ways. First of all, the parking control officer is capable of more quickly citing violations, thus, citing more meters. Secondly, the parking control officer does not waste time viewing unexpired parking meters. Thirdly, the enforcement staff may be reduced.

The circuitry required for signal generation timing and presence indicating are all conventional and known to those skilled in the art and need not be described in detail herein. Preferably the parking meters would be powered with underground wiring which could also be used to transmit a time out signal to a remote signal sending location.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. An expired parking meter indicating system to facilitate the enforcement of parking regulations and reduce the work force required to bring about the enforcement, said system comprising the following components in addition to a parking meter and a parking space:

a detector connected to said parking meter to ascertain the presence of a motor vehicle in said parking space and to provide a vehicle presence signal to initiate a parking control cycle;

payment receiving means affixed to said parking meter to provide a payment and payment amount signal responsive to a payment made by the occupier of the parking space, said payment receiving means including a delay circuit to provide a reasonable time for the occupier to make a payment;

timing means including signal receiving means responsive to both the vehicle presence signal of said detector and the payment and payment amount signal of the payment receiving means and further including means for sending a time out signal when the combination of the payment and payment amount signal and the duration of the presence signal indicate a time out condition;

signal generator control means connected to by said parking meter, said signal generator control means being configured to receive said time out signal from the timing means indicating a time out condition and transmitting an output signal receivable by a parking control officer at a location remote from said parking meter;

reset means connected to said detector so that when a driver removes a vehicle, a new parking control cycle will not be initiated until a new vehicle enters the parking space; and a time out signal interrupt responsive to an input from a parking control officer upon citing the vehicle for a parking violation, thereby clearing the time out signal sent out to parking control officers.

2. The expired parking meter indicating system of claim 1 further including a time out signal interrupt responsive to a payment and payment amount signal from said payment receiving means when the occupier of the vehicle makes an additional payment, thereby permitting the occupant to negate the time out signal and initiate a subsequent amount of time.

3. The expired parking meter indicating system of claim 1 further including on off control means responsive to the day of the week, a holiday and to the enforcement time during the day so that the meters will only operate during a predetermined time period.

4. The expired parking meter indicating system of claim 1 further including means for resetting the payment and payment amount signal to zero when a parking control cycle is initiated.

5. The expired parking meter indicating system of claim 1 wherein the output signal of the signal generator control means is a light.

6. The expired parking meter indicating system of claim 1 wherein the output signal of the signal generator control means includes a wireless transmission receivable by a parking control officer.

7. The expired parking meter indicating system of claim 1 further including a remaining time readout held by said parking meter.

8. The expired parking meter indicating system of claim 1 wherein said payment receiving means is a credit card receiving system.

* * * * *